(12) United States Patent
Zhao et al.

(10) Patent No.: US 10,403,255 B2
(45) Date of Patent: Sep. 3, 2019

(54) AUDIO PROCESSING METHOD, APPARATUS AND SYSTEM

(71) Applicant: GUANGZHOU KUGOU COMPUTER TECHNOLOGY CO., LTD., Guangzhou, Guangdong Province (CN)

(72) Inventors: Weifeng Zhao, Guangdong (CN); Chun Li, Guangdong (CN); Xiang Liu, Guangdong (CN); Haojie Xu, Guangdong (CN); Dewen Zhang, Guangdong (CN); Fei Zheng, Guangdong (CN); Li Cao, Guangdong (CN); Tianwen Li, Guangdong (CN); Xiangwen Chen, Guangdong (CN); Baohua Wang, Guangdong (CN); Meixing Wang, Guangdong (CN); Zhiyong Liu, Guangdong (CN); Siliang Huang, Guangdong (CN); Bo Song, Guangdong (CN); Weilong Wang, Guangdong (CN); Xiaokang Deng, Guangdong (CN); Shengmin Tan, Guangdong (CN); Hongcheng Fu, Guangdong (CN); Qing Zhang, Guangdong (CN)

(73) Assignee: GUANGZHOU KUGOU COMPUTER TECHNOLOGY CO., LTD., Guangzhou, Guangdong (CN)

( * ) Notice: Subject to any disclaimer, the term of this patent is extended or adjusted under 35 U.S.C. 154(b) by 0 days.

(21) Appl. No.: 15/819,734

(22) Filed: Nov. 21, 2017

(65) Prior Publication Data
US 2018/0090116 A1 Mar. 29, 2018

Related U.S. Application Data
(63) Continuation of application No. PCT/CN2016/077218, filed on Mar. 24, 2016.

(30) Foreign Application Priority Data

May 27, 2015 (CN) .......................... 2015 1 0278911
May 27, 2015 (CN) .......................... 2015 1 0280087
May 27, 2015 (CN) .......................... 2015 1 0280492

(51) Int. Cl.
*G10H 1/36* (2006.01)
*G11B 20/10* (2006.01)
(Continued)

(52) U.S. Cl.
CPC ............... *G10H 1/361* (2013.01); *G10H 1/00* (2013.01); *G10H 1/0008* (2013.01); *G10H 1/36* (2013.01);
(Continued)

(58) Field of Classification Search
CPC ............ G10H 1/365; G10H 2220/011; G10H 2240/145; G10H 1/361; G10H 2240/131;
(Continued)

(56) References Cited

U.S. PATENT DOCUMENTS 5,194,682 A * 3/1993 Okamura ............. G10H 1/0066
 369/47.2
5,247,126 A * 9/1993 Okamura ............... G10H 1/363
 360/49
(Continued)

FOREIGN PATENT DOCUMENTS

CN 101131816 A 2/2008
CN 101483536 A 7/2009
(Continued)

OTHER PUBLICATIONS

International Search Report in English & Chinese of the ISA, regarding Application No. PCT/CN2016/077218, Haidian District, Beijing, dated Jun. 23, 2016.
(Continued)

*Primary Examiner* — Marlon T Fletcher
(74) *Attorney, Agent, or Firm* — Harness, Dickey & Pierce, P.L.C.

(57) ABSTRACT

An audio processing method, apparatus and system, capable of realizing the experience of singing Karaoke with other people. The method comprises: acquiring an audio file of a song and a lyric file of the song; playing the audio file at display time corresponding to a first lyric part of the lyric file and recording audio data of a user; playing the audio file at display time corresponding to a second lyric part of the lyric file; and performing audio mixing on the audio data of the
(Continued)

user and audio data of the audio file at the display time corresponding to the first lyric part.

29 Claims, 6 Drawing Sheets

(51) Int. Cl.
| | |
|---|---|
| *G10H 1/00* | (2006.01) |
| *G10L 25/48* | (2013.01) |
| *G10L 25/03* | (2013.01) |
| *G10H 1/38* | (2006.01) |
| *G11B 27/031* | (2006.01) |
| *G11B 27/10* | (2006.01) |

(52) U.S. Cl.
CPC ............... *G10H 1/38* (2013.01); *G10L 25/03* (2013.01); *G10L 25/48* (2013.01); *G11B 20/10* (2013.01); *G11B 27/031* (2013.01); *G11B 27/102* (2013.01); *G10H 2210/005* (2013.01)

(58) Field of Classification Search
CPC .. G10H 1/36; G10H 2240/125; G10H 1/0033; G10H 2210/005; G10H 2240/325
See application file for complete search history.

(56) References Cited

U.S. PATENT DOCUMENTS

| | | | | |
|---|---|---|---|---|
| 5,335,073 | A * | 8/1994 | Yamamoto | G10H 1/0066 348/478 |
| 5,616,878 | A * | 4/1997 | Lee | G10H 1/361 84/609 |
| 5,811,708 | A | 9/1998 | Matsumoto | |
| 5,880,388 | A | 3/1999 | Kajiyama et al. | |
| 5,886,275 | A * | 3/1999 | Kato | G10H 1/365 434/307 A |
| 5,955,693 | A * | 9/1999 | Kageyama | G10H 1/366 84/610 |
| 5,967,792 | A * | 10/1999 | Matsumoto | G09B 15/04 434/307 A |
| 6,022,223 | A * | 2/2000 | Taniguchi | G10H 1/365 370/437 |
| 6,074,215 | A * | 6/2000 | Tsurumi | G10H 1/365 434/307 A |
| 6,083,009 | A | 7/2000 | Kim et al. | |
| 6,231,347 | B1 * | 5/2001 | Tsai | G06F 9/445 348/461 |
| 6,979,769 | B1 * | 12/2005 | Majima | G10H 1/0066 434/307 A |
| 7,134,876 | B2 * | 11/2006 | Hou | G10H 1/361 434/307 A |
| 9,224,374 | B2 | 12/2015 | Zhang et al. | |
| 2002/0105359 | A1 * | 8/2002 | Shimizu | G10H 7/02 327/1 |
| 2002/0189429 | A1 * | 12/2002 | Qian | G10H 1/0041 84/610 |
| 2003/0126973 | A1 | 7/2003 | Kung | |
| 2008/0184870 | A1 | 8/2008 | Toivola | |
| 2009/0038467 | A1 * | 2/2009 | Brennan | G09B 5/00 84/609 |
| 2011/0126103 | A1 | 5/2011 | Cohen et al. | |
| 2014/0000441 | A1 | 1/2014 | Miyajima | |
| 2014/0358566 | A1 | 12/2014 | Zhang et al. | |

FOREIGN PATENT DOCUMENTS

| | | |
|---|---|---|
| CN | 101859561 A | 10/2010 |
| CN | 102456340 A | 5/2012 |
| CN | 102497448 A | 6/2012 |
| CN | 103165119 A | 6/2013 |
| CN | 103295568 A | 9/2013 |
| CN | 103337240 A | 10/2013 |
| CN | 103841278 A | 6/2014 |
| CN | 104392711 A | 3/2015 |
| CN | 104966527 A | 10/2015 |
| CN | 105006234 A | 10/2015 |
| CN | 105023559 A | 11/2015 |
| EP | 0725381 A1 | 8/1996 |
| EP | 3007163 A1 | 4/2016 |
| JP | H0744182 A | 2/1995 |
| JP | H08306168 A | 11/1996 |
| JP | H1091173 A | 4/1998 |
| JP | 2001042878 A | 2/2001 |
| JP | 2004053736 A | 2/2004 |
| JP | 2004240065 A | 8/2004 |
| JP | 2005010639 A | 1/2005 |
| JP | 2008051896 A | 3/2008 |
| JP | 2009075611 A | 4/2009 |
| JP | 2010014823 A | 1/2010 |
| JP | 2010164922 A | 7/2010 |
| JP | 2011191357 A | 9/2011 |
| JP | 2012027417 A | 2/2012 |
| KR | 20080082019 A | 9/2008 |
| TW | 200923675 A | 6/2009 |
| TW | 201228290 A | 7/2012 |

OTHER PUBLICATIONS

First Chinese Office Action regarding Application No. 201510278911.5 dated Aug. 8, 2016. English translation provided.
First Chinese Office Action regarding Application No. 201510280087.7 dated May 20, 2016. English translation provided.
First Chinese Office Action regarding Application No. 201510280492.9 dated Aug. 8, 2016. English translation provided.
First Japanese Office Action for JP2017560977, dated Sep. 11, 2018. Translation provided by Unitalen Attorneys at Law.
Extended European Search Report regarding International Application No. PCT/CN2016/077218 dated Dec. 19, 2018.
Extended European Search Report regarding International Application No. PCT/CN2016/081650 dated Jan. 2, 2019.
First Japanese Office Action regarding Japanese Application No. 2017-560972 dated Jan. 22, 2019. English translation provided by Unitalen Attorneys at Law.
Korean Office Action regarding Korean Application No. 2017-7037253 dated Apr. 29, 2019.

* cited by examiner

US 10,403,255 B2

AUDIO PROCESSING METHOD, APPARATUS AND SYSTEM

CROSS REFERENCE OF RELATED APPLICATION

The application is the Continuation Application of International Application No. PCT/CN2016/077218, titled "AUDIO PROCESSING METHOD, DEVICE AND SYSTEM", and filed on Mar. 24, 2016, which claims priority to Chinese Patent Application No. 201510278911.5, titled "KARAOKE PROCESSING METHOD AND DEVICE", filed on May 27, 2015 with the State Intellectual Property Office of the People's Republic of China, Chinese Patent Application No. 201510280087.7, titled "KARAOKE PROCESSING METHOD, DEVICE AND SYSTEM" filed on May 27, 2015 with the State Intellectual Property Office of the People's Republic of China, and Chinese Patent Application No. 201510280492.9, titled "KARAOKE PROCESSING METHOD AND SYSTEM", filed on May 27, 2015 with the State Intellectual Property Office of the People's Republic of China, which are incorporated herein by reference in their entireties.

FIELD

The present disclosure relates to the field of audio processing, and in particular to an audio processing method, an audio processing device and an audio processing system.

BACKGROUND

With improved quality of life, a Karaoke application gradually enters daily life of people, and has increasingly rich functions.

The Karaoke application is an integration of a music player and recording software, which may play original audio, record a song of a user, and mix the recorded song with accompaniment audio to obtain a music file. The user may upload the music file to the network, such that more people can listen to the recorded song.

Generally, when the user records the song, the Karaoke application provides the user with an accompaniment audio file as an accompaniment for recording the song. However, only one user can use the Karaoke during the process, and the Karaoke experience of singing together with others (for example, a star) cannot be obtained.

SUMMARY

An audio processing method, an audio processing device and an audio processing system are provided according to embodiments of the present disclosure, so as to achieve a Karaoke experience of singing together with others.

In a first aspect, an audio processing method is provided according to the embodiments of the present disclosure. The method includes:

obtaining an audio file of a song and a lyrics file of the song;

playing the audio file and recording audio data of a user during display time for a first lyrics part of the lyrics file;

playing the audio file during display time for a second lyrics part of the lyrics file; and mixing the audio data of the user with audio data of the audio file corresponding to the display time for the first lyrics part.

In a second aspect, an audio processing device is provided according to the embodiments of the present disclosure. The device includes at least one processor and a memory, and the memory stores program instructions which when executed by the processor allow the audio processing device to perform the method according to any embodiment of the present disclosure.

In a third aspect, an audio processing system is provided according to the embodiments of the present disclosure. The system includes a server and at least one client device, and the server and/or the client device is configured to perform the method according to any embodiment of the present disclosure.

In a fourth aspect, an audio processing device is provided according to the embodiments of the present disclosure. The device includes:

a first obtaining unit configured to obtain an audio file of a song and a lyrics file of the song;

a first processing unit configured to play the audio file during display time for a first lyrics part of the lyrics file and display time for a second lyrics part of the lyrics file, and record audio data of a user during the display time for the first lyrics part of the lyrics file; and a first mixing unit configured to mix the audio data of the user with audio data of the audio file corresponding to the display time for the first lyrics part.

As compared with the conventional technology, in the embodiments of the present disclosure, the audio file (for example the accompaniment audio file) is played and the audio data of the user is recorded during the display time for the first lyrics part, and the audio file (for example the original audio file) is played during the display time for the second lyrics part, such that the user sings the song during the display time for the first lyrics part and others or a star sings the song during the display time for the second lyrics part, thereby obtaining a Karaoke experience of singing together with others or the star.

DETAILED DESCRIPTION OF THE EMBODIMENTS

Figure 1:
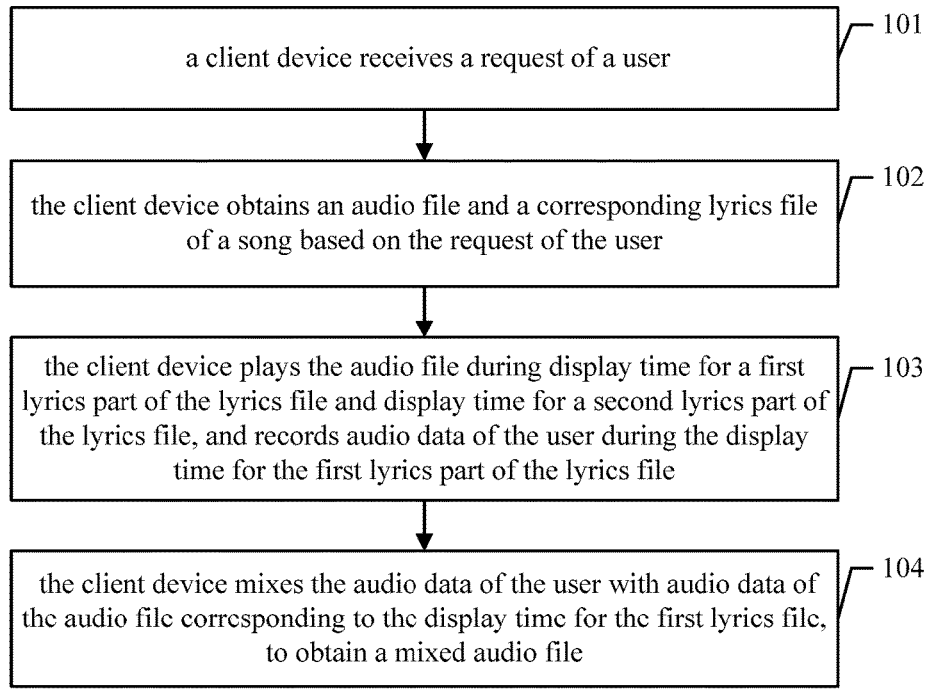
FIG. 1 is a diagram of an audio processing method according to an exemplary embodiment of the present disclosure.

According to embodiments of the present disclosure, an audio processing method, au audio processing device and an audio processing system are provided, so as to obtain a Karaoke experience of singing together with others (for example a star). Details are described hereinafter.

Technical solutions in the embodiments of the present disclosure are described clearly and completely in conjunction with drawings hereinafter. Apparently, the described embodiments are only some rather than all of the embodiments of the present disclosure. Any other embodiments obtained based on the embodiments of the present disclosure by those skilled in the art without any creative work fall within the scope of protection of the present disclosure.

Terms "first", "second", "third" and "fourth" and so on (if the terms exist) in the description, claims and drawings of the present disclosure are to distinguish similar objects, and are not intended to describe a certain order or a sequential order. It should be understood that the data used in this way may be exchanged with each other in a suitable case, such that the described embodiments can be implemented in an order different from the order shown in the drawings or described in the content. In addition, terms "include" and "comprise" and any variations thereof are not intended to be exclusive. For example, a process, a method, a system, a product or a device including a series of steps or units are not limited to the steps or units clearly listed, and may further include other steps or units which are not clearly listed or are inherent for the process, the method, the product or the device.

An audio processing method is provided according to an embodiment of the present disclosure. The method includes: obtaining an audio file of a song and a lyrics file of the song; playing the audio file and recording audio data of a user during display time for a first lyrics part of the lyrics file; playing the audio file during display time for a second lyrics part of the lyrics file; and mixing the audio data of the user with audio data of the audio file corresponding to the display time for the first lyrics part. Optionally, the audio file may be played during the display time for the second lyrics part of the lyrics file, and no audio data of the user is recorded. Alternatively, the audio file is played and the audio data of the user is recorded during the display time for the second lyrics part of the lyrics file, but the audio data of the user recorded during the display time for the second lyrics part of the lyrics file is not adopted or is removed when mixing is performed or when a chorus file is generated. The audio processing method according to the embodiment of the present disclosure may be performed by any computing device, and the computing device includes but is not limited to a mobile phone, a personal computer (PC, Personal Computer) and/or a tablet computer. The audio processing method according to the embodiments of the present disclosure may be performed by a server or a client device in a system including the server and the client device or may be performed by the server in cooperation with the client device.

An example for the audio processing method according to the embodiments of the present disclosure is a Karaoke processing method. Those skilled in the art should understand that the audio processing method may have other applications. In addition, the lyrics file may be replaced with any other text file or picture, and audio of the song may be replaced with other audio, which do not depart from principles of the present disclosure.

It should be noted that, the client device may be a mobile phone, a personal computer (PC, Personal Computer) and/or a tablet computer and so on. In a specific implementation, a webpage may be logged into via these client devices, or programs are loaded on theses client devices, or applications (APP, Applications) published by various mobile platforms are used to access a Karaoke service.

Referring to FIG. 1, an audio processing method is shown according to an exemplary embodiment of the present disclosure. The embodiment is described with a client device as a main object to perform the audio processing method, and those skilled in the art should understand that the method according to the embodiment may be performed by other main objects.

In step 101, a client device receives a request of a user.

For example, when selecting a song for Karaoke, the user needs to input a Karaoke request to the client device to trigger a Karaoke processing process.

In step 102, the client device obtains an audio file of the song and a corresponding lyrics file of the song based on the request. The audio file of the song may include an accompaniment audio file and an original audio file of the song and so on. Thus, obtaining, by the client device, the audio file of the song, may include obtaining, by the client device, the accompaniment audio file and the original audio file of the song and so on.

Once receiving the Karaoke request input by the user, the client device may determine a song selected by the user based on the Karaoke request, and obtain an accompaniment audio file, an original audio file and a corresponding lyrics file of the song. The client device may obtain, for example, the accompaniment audio file, the original audio file and the corresponding lyrics file of the song from a server.

The accompaniment audio file and the original audio file may be, for example, raw audio data. In an actual application, if the obtained accompaniment audio file or original audio file is audio data in a compression format, for example an mp3 format, the server firstly decompresses the audio data in the compression format into raw audio data.

It should be noted that, the lyrics file may include, for example, time information for identifying lyrics display time, such that the lyrics file synchronizes with the accompaniment audio file and the original audio file based on the time information. For example, the lyrics file may include an LRC lyrics file, and the LRC lyrics file identifies the lyrics display time through a timestamp contained therein.

In step 103, the client device plays the audio file during the display time for the first lyrics part of the lyrics file and during the display time for the second lyrics part of the lyrics file, and records audio data of the user during the display time for the first lyrics part of the lyrics file.

According to an embodiment of the present disclosure, the audio file is played during the display time for the second lyrics part of the lyrics file, but no audio data of the user is recorded. For example, a microphone for recording the audio data of the user is turned off. According to another embodiment of the present disclosure, the audio file is played and the audio data of the user is recorded simultaneously during the display time for the second lyrics part of the lyrics file, but the audio data of the user recorded during the display time for the second lyrics part of the lyrics file is removed (or not used) when mixing is performed or when generating a chorus file.

According to the embodiment of the present disclosure, in a case that the obtained audio file of the song includes an accompaniment audio file and an original audio file of the song, the accompaniment audio file is played during the display time for the first lyrics part of the lyrics file, and the original audio file is played during the display time for the second lyrics part of the lyrics file.

Optionally, before playing the audio file and recording the audio data of the user, the client device divides the lyrics file to obtain the first lyrics part and the second lyrics part.

The client device may divide the lyrics file to obtain the first lyrics part and the second lyrics part in multiple ways, which are illustrated with examples hereinafter.

In a first way, before step 103, the client device receives a dividing instruction of the user and divides the lyrics file based on the dividing instruction to obtain the first lyrics part and the second lyrics part.

In the embodiment, multiple lyrics dividing strategies may be preset in the client device and the lyrics file is divided into two lyrics parts based on the lyrics dividing strategies described above. For example:

(1) the client device determines section information of the lyrics file based on time information in the lyrics file, and divides the lyrics file into two lyrics parts based on the section information.

In the embodiment, the time information of the lyrics file may reflect start points and end points of display time for various sections of a corresponding song. Thus, the client device may determine the number of sections included in the lyrics file, and a start point and an end point of the display time for each section, based on the time information. The lyrics file is divided based on the section information, and the server may determine at least one preset section as one lyrics part and determine a remaining part as another lyrics part. The number of sections of each lyrics part, and specific sections included in each lyrics part are not limited herein. For example, a structure of the section information may be represented as:

```
typedef struct section_info{
int section_id;        // section id
int start_ms;          // start time instant ms
int end_ms;            // end time instant ms
int role_id;           // role id
}Ssection, *PSection.
```

The above role id represents whether a corresponding part of the song is sung by a female or a male. Preferably, sections corresponding to the part sung by the female may be set as one lyrics part, and sections corresponding to the part sung by the male may be set as another lyrics part, such that the lyrics are divided based on a difference between the male role and the female role, to obtain two lyrics parts for different roles.

(2) The client device determines a verse part and a refrain part of the lyrics file, determines the verse part as one lyrics part, and determines the refrain part as another lyrics part.

In the embodiment, the client device may divide the lyrics based on a difference between the verse and the refrain, so as to obtain one lyrics part corresponding to the verse and another lyrics part corresponding to the refrain, thereby dividing the lyrics file into two lyrics parts based on the difference between the verse and the refrain.

(3) The client device divides the lyrics file based on a custom template to obtain two lyrics parts.

In the embodiment, the client device may define multiple templates for dividing lyrics in advance, and then divide the lyrics file based on the custom template to obtain two lyrics parts. For example, N fixed sentences of lyrics or N fixed words are set as one lyrics part. The way to set the custom template is not limited herein, and those skilled in the art may set multiple different templates based on actual cases.

It should be noted that, once receiving a dividing instruction of a user, the client device divides the lyrics file based on the dividing instruction and a corresponding lyrics dividing strategy, so as to obtain a first lyrics part and a second lyrics part. Optionally, in an actual application, a selecting module may be provided in the client device, for the user to select from the two divided lyrics parts, and to designate a part as the first lyrics part or designate a part as the second lyrics part. For example, the user may select, via the selecting module, the part which is sung by male as the first lyrics part for singing by himself, or select the part which is sung by male as the second lyrics part for singing by others or a star.

After dividing the lyrics file to obtain the first lyrics part and the second lyrics part, the client device may play an accompaniment audio file and record audio data of the user during display time for the first lyrics part, and play an original audio file during display time for the second lyrics part.

In a second way, the client device divides the lyrics file based on whether a sound is input, to obtain a first lyrics part and a second lyrics part.

Specifically, the client device detects whether a sound is input, and in a case that it is detected that a sound is input, the client device determines a lyrics part of the lyrics file corresponding to the display time as the first lyrics part, plays an accompaniment audio file and switches to a microphone input mode to record audio data of the user. In a case that it is detected no sound is input, the client device determines a lyrics part of the lyrics file corresponding to the display time as the second lyrics part and plays an original audio file. It should be understood that, the dividing of the lyrics file and the operations such as playing and recording are performed synchronously, instead of playing the accompaniment audio file and recording the audio data of the user during the display time for the first lyrics part, and playing the original audio file during the display time for the second lyrics part, by the client device after obtaining the first lyrics part and the second lyrics part.

In the embodiment, how to divide the lyrics file to obtain the first lyrics part and the second lyrics part is illustrated only by several examples. In an actual application, the client device may combine the dividing ways or use more other dividing ways, which is not limited herein.

In order for the user to identify lyrics to be sung by the user himself and lyrics to be sung by others or a star, the client device may set identifiers for the lyrics displayed on the client device. Preferably, in the embodiment, the client device sets a first identifier for the first lyrics part displayed on the client device and sets a second identifier for the second lyrics part displayed on the client device. It should be understood that, the identifier may be a color identifier. For example, the first lyrics part is displayed in one color and the second lyrics part is displayed in another color. Alternatively, the identifier may be a highlighted identifier. For example, the first lyrics part is highlighted and the second lyrics part is not highlighted. Specific implementations of the identifier are not limited herein, and those skilled in the art may obtain more other identifier forms as needed.

In step 104, the client device mixes the audio data of the user with audio data of the audio file corresponding to the display time for the first lyrics part, to obtain a mixed audio file.

According to the embodiment of the present disclosure, after obtaining the audio data of the user (for example, audio data collected by a microphone), the client device mixes the audio data of the user with the audio data of the audio file corresponding to the display time for the first lyrics part, to obtain a mixed audio file. Hence, the mixed audio file may reflect all the audio data of the part sung by the user, including the sound of the user and the corresponding accompaniment.

The mixing may be performed with the conventional mixing algorithm. For example, data for corresponding sampling points is directly added to obtain a sum, and then the sum is divided by two.

In a case that the audio file includes an accompaniment audio file and an original audio file, the client device mixes the audio data of the user with audio data of the accompaniment audio file during the display time for the first lyrics part.

According to an optional embodiment of the present disclosure, after mixing the audio data of the user with the audio data of the audio file corresponding to the display time for the first lyrics part, the client device outputs (or selects) a mixed audio file during the display time for the first lyrics part, and outputs (or selects) the audio file during the display time for the second lyrics part, to generate a chorus file. In a case that the audio file includes an accompaniment audio file and an original audio file, the original audio file is output (or selected) during the display time for the second lyrics part, to generate the chorus file.

During a process of generating a chorus file, audio data of the mixed audio file during the corresponding time is obtained during the display time for the first lyrics part, audio data of the original audio file during the corresponding time is obtained during the display time for the second lyrics part, and then audio data for various time points are synthesized as an audio file in a chronological order, and the synthesized audio fie is the chorus file. It should be noted that, during the process of generating the chorus file, corresponding time for the audio data of the mixed audio file and the original audio file to be output is determined based on the display time for the lyrics. Hence, for the obtained chorus file, the part sung by the user for the corresponding time is output during the display time for the first lyrics part, and the original part for the corresponding time is output during the display time for the second lyrics part.

Optionally, the client device balances audio data of the chorus file at a switching point. The switching point refers to a time instant when the display time for the first lyrics part is switched to the display time for the second lyrics part or a time instant when the display time for the second lyrics part is switched to the display time for the first lyrics part. In addition, since the chorus audio file is formed by splicing two audio files, the balancing performed at the switching point can ensure an audio quality of the chorus audio file. In the embodiment, one may refer to the conventional audio splicing technology, such as mean filtering and superposition, for specific balancing methods.

Optionally, in the embodiment, the user may upload the chorus file to the network via the client device, thereby sharing the chorus sung along with others or the star.

In the above, it is described that the audio file of the song obtained by the client device may include the accompaniment audio file and the original audio file of the song. Alternatively, the audio file of the song obtained by the client device may be a target audio file described below. Hence, the audio file of the song obtained by the client device may include the target audio file which is sent by the server and is received by the client device. In addition, the lyrics file of the song obtained by the client device may include a target lyrics file which is sent by the server and is received by the client device. A process of sending the target audio file and/or target lyrics file by the server will be described in detail in the following. In a case that the client device receives the target audio file and/or target lyrics file sent by the server, the client device may not divide the lyrics file in step 103.

Compared with the conventional technology, the accompaniment audio file is played and the audio data of the user is recorded only during the display time for the first lyrics part, and the original audio file is played during the display time for the second lyrics file according to the embodiment of the present disclosure. Therefore, the song can be sung by the user during the display time for the first lyrics part and can be sung by others or the star during the display time for the second lyrics part, thereby obtaining a Karaoke experience of singing together with others or the star. Furthermore, the user can obtain the Karaoke experience of singing together with others or the star using a common accompaniment audio file via the client device according to the embodiment.

Figure 2:
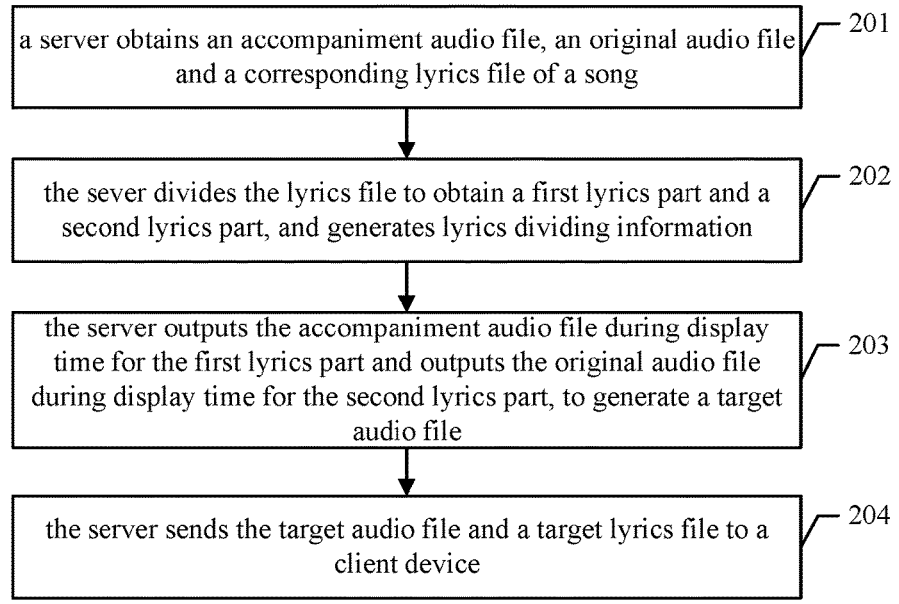
FIG. 2 is a diagram of an audio processing method according to another exemplary embodiment of the present disclosure.

Referring to FIG. 2, an audio processing method according to another embodiment of the present disclosure is shown. The embodiment is described with a server as a main object for performing the audio processing method. Those skilled in the art should understand that the method according to the embodiment may be performed by other main objects.

In step 201, a server obtains an accompaniment audio file, an original audio file and a corresponding lyrics file of a song. The accompaniment audio file, the original audio file and the corresponding lyrics file have been described in detail above, which are not repeated herein for conciseness.

In step 202, the server divides the lyrics file to obtain a first lyrics part and a second lyrics part, and generates lyrics dividing information.

The server may divide the lyrics file in multiple ways to obtain the first lyrics part and the second lyrics part. The multiples ways are illustrated with examples. In a first way, the server determines section information of the lyrics file based on time information, and then divides the lyrics file based on the section information to obtain the first lyrics part and the second lyrics part.

In a second way, the server determines a verse part and a refrain part of the lyrics file, and then determines the verse part as the first lyrics part and determines the refrain part as the second lyrics part, or then determines the refrain part as the first lyrics part and determines the verse part as the second lyrics part.

In a third way, the server divides the lyrics file based on a custom template to obtain the first lyrics part and the second lyrics part.

It should be noted that, several examples for dividing the lyrics file are described above, and these examples are not described in detail herein for conciseness. One may refer to the related description in step 103 for the detailed description of these examples.

Optionally, before performing step 202, the server may receive a dividing instruction sent by a client device, where the dividing instruction is to indicate a dividing method designated by the user, and divides the lyrics file based on the dividing instruction to obtain the first lyrics part and the second lyrics part. Thus, the user can select the lyrics dividing method, and obtain the first lyrics part and the second lyrics part conforming to intension of the user.

In the embodiment, after dividing to obtain the first lyrics part and the second lyrics part, the server records a divided result to generate corresponding lyrics dividing information. The lyrics dividing information includes identifier information for identifying the first lyrics part. Since the lyrics are composed of two parts, the server or the client device may identify the second lyrics part when obtaining the identifier information for identifying the first lyrics part. Of course, in some other embodiments, the lyrics dividing information may include identifier information for identifying the second lyrics part.

In step 203, the server outputs (or selects) an accompaniment audio file during display time for the first lyrics part, and outputs (or selects) an original audio file during display time for the second lyrics part, to generate a target audio file.

During a process of generating a chorus file, audio data of the accompaniment audio file during the corresponding time is obtained during the display time for the first lyrics part, audio data of the original audio file during the corresponding time is obtained during the display time for the second lyrics part, then audio data for various time points are synthesized as an audio file in a chronological order, and the synthesized audio file is the target audio file. It should be noted that, during the process of generating the target audio file, corresponding time for the audio data of the accompaniment audio file and the original audio file to be output is determined based on the display time for the lyrics. Hence, during playing the target audio file, the accompaniment audio for the corresponding time is output during the display time for the first lyrics part, and the original audio for the corresponding time is output during the display time for the second lyrics part. That is, the target audio file can be switched automatically between the accompaniment audio and the original audio.

Optionally, the method further includes: balancing, by the server, audio data of the target audio file at a switching point. The switching point refers to a time instant when the display time for the first lyrics part is switched to the display time for the second lyrics part, or a time instant when the display time for the second lyrics part is switched to the display time for the first lyrics part. Since the target audio file is formed by splicing two audio files, the balancing at the switching point may ensure an audio quality of the target audio file. In the embodiment, one may refer to the conventional audio splicing technology, such as mean filtering and superposition for the balancing methods.

In step 204, the server sends the target audio file and a target lyrics file to the client device.

Once receiving a request (for example, a Karaoke request) sent by the client device, the server sends the target audio file and the target lyrics file to the client device, such that the client device provides a Karaoke service to the user with the target audio file as an accompaniment audio and with the target lyrics file as lyrics to be played. The target lyrics file is obtained based on the lyrics file carrying lyrics dividing information. In the embodiment, when playing the target audio data, the client device outputs the accompaniment audio for the corresponding time during the display time for the first lyrics part, and outputs the original audio for the corresponding time during the display time for the second lyrics part, such that the user sings the song during the display time for the first lyrics part and others sing (or the star sings) the song during the display time for the second lyrics part, thereby obtaining a Karaoke experience of singing together with others or the star. It should be understood that, in the embodiment, the server generates the target audio file and the target lyrics file and sends the target audio file and the target lyrics file to the client device, thereby obtaining the Karaoke experience of singing together with others or the star without changing logic of the client device.

Compared with the conventional technology, the target audio file sent from the server to the client device is the accompaniment audio during the display time for the first lyrics part and is the original audio during the display time for the second lyrics part according to the embodiment of the present disclosure. The accompaniment audio file is directly provided to the client device in the conventional technology, comparatively, the user can sing the song during the display time for the first lyrics part and others or the star can sing the song during the display time for the second lyrics part the embodiment of the present disclosure, thereby obtaining a Karaoke experience of singing together with others or the star.

Figure 3:
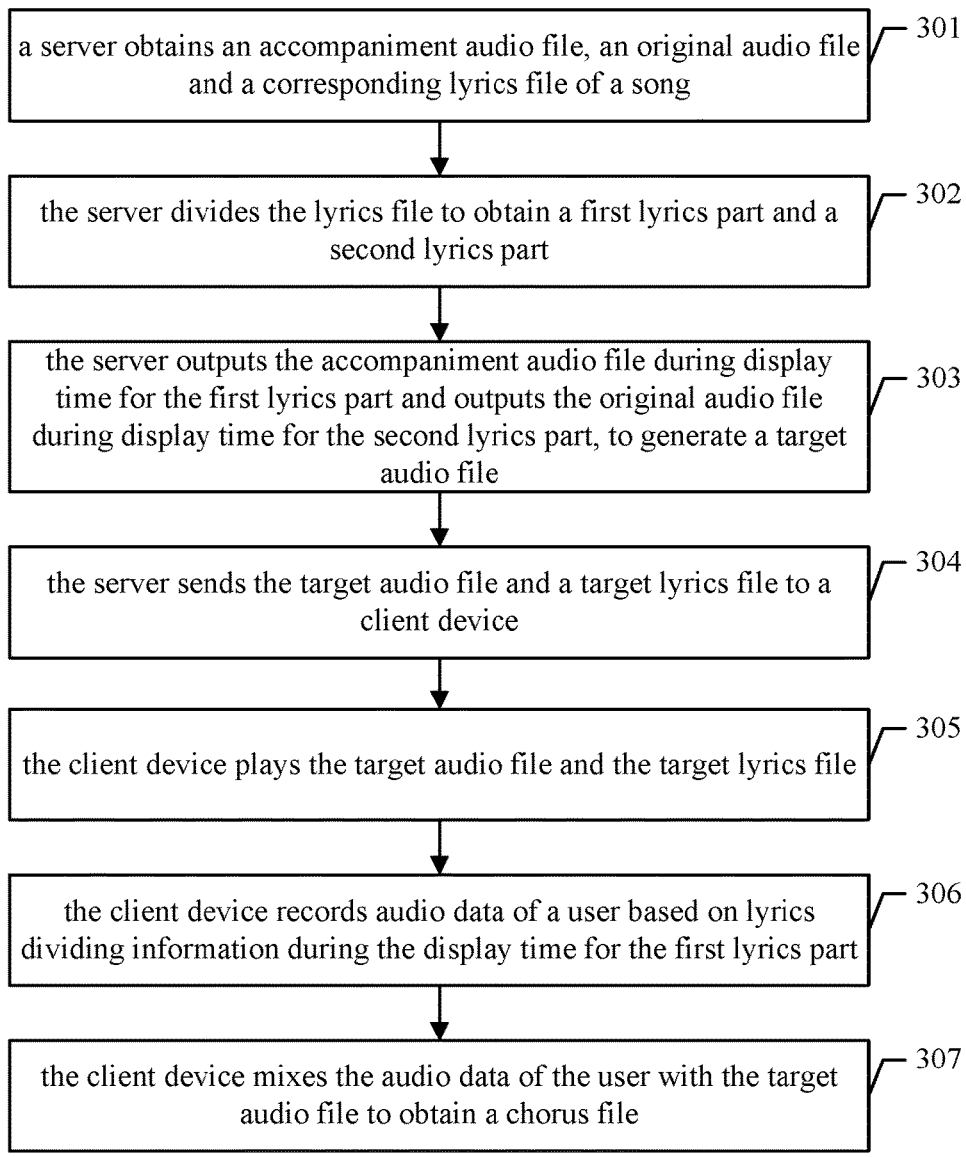
FIG. 3 is a diagram of an audio processing method according to still another exemplary embodiment of the present disclosure.

Referring to FIG. 3, an audio processing method according to another embodiment of the present disclosure is shown. The method includes step 301 to step 307.

In step 301, a server obtains an accompaniment audio file, an original audio file and a lyrics file of a song.

In step 302, the server divides the lyrics file to obtain a first lyrics part and a second lyrics part.

In step 303, the server outputs the accompaniment audio file during display time for the first lyrics part, and outputs the original audio file during display time for the second lyrics part, to generate a target audio file.

In step 304, the server sends the target audio file and a target lyrics file to a client device.

The process of step 301 to step 304 is similar to the process of step 201 to step 204 according to the embodiment shown in FIG. 2, which is not described herein.

In step 305, the client device plays the target audio file and the target lyrics file.

After the client device receives the target audio file and the target lyrics file sent by the server, a Karaoke application of the client device plays the target audio file and the target lyrics file. The target audio file is played as accompaniment audio.

In step 306, the client device records audio data of a user based on lyrics diving information during the display time for the first lyrics part.

In the embodiment, the client device can identify the display time for the first lyrics part and the display time for the second lyrics part based on the lyrics dividing information, record the audio data of the user during the display time for the first lyrics part, and stop recording during the display time for the second lyrics part. In this case, the target file played by the client device is sung by others or the star. Hence, the user sings the song during the display time for the first lyrics part, and others or the star sings the song during the display time for the second lyrics part, thereby obtaining a Karaoke experience of singing together with others or the star.

In step 307, the client device mixes the audio data of the user with the target audio file to obtain a chorus file.

In the embodiment, the obtained chorus file is audio data sung by the user during the display time for the first lyrics part, and is audio data (i.e., audio data of the original audio file for the corresponding time) sung by others or the star during the display time for the second lyrics part. Optionally, in the embodiment, the user may upload the chorus file to the network via the client device, thereby sharing the chorus sung along with others or the star.

Figure 4:
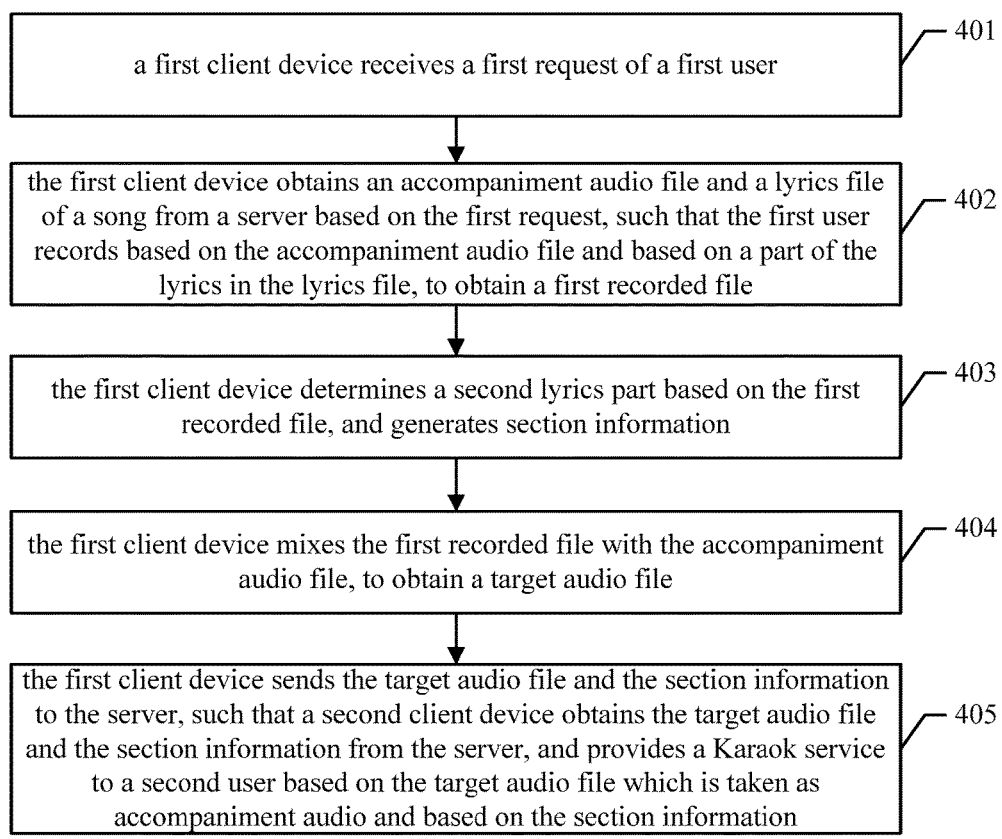
FIG. 4 is a diagram of an audio processing method according to yet another exemplary embodiment of the present disclosure.

Referring to FIG. 4, an audio processing method according to another embodiment of the present disclosure is shown. The method includes step 401 to step 405.

In step 401, a first client device receives a first request of a first user.

The first request may be a first chorus request for, for example, starting a chorus. For example, in an actual application, a button corresponding to the first chorus request may be provided in the first client device. When the first user presses the button, the first client device receives the first chorus request.

In step 402, the first client device obtains, based on the first request, an accompaniment audio file and a lyrics file of a song from a server, such that the first user records based on the accompaniment audio file and based on a part of lyrics of the lyrics file, to obtain a first recorded file. The accompaniment audio file, the original audio file and the lyrics file have been described in detail above, which are not described herein for conciseness.

After obtaining the accompaniment audio file and the lyrics file, the client device plays the accompaniment audio file and the lyrics file, and the first user may select any part of the lyrics to sing. Of course, the first user does not sing all of the lyrics. The client device records the singing which is performed by the first user based on the accompaniment audio file and based on a part of lyrics of the lyrics file, to obtain the first recorded file.

In step 403, the first client device determines a second lyrics part based on the first recorded file, and generates section information.

The second lyrics part refers to the part of the lyrics which has been sung by the first user. The first client device identifies, based on the first recorded file, the lyrics parts which have been sung by the first user, and correspondingly generates section information. The section information includes identifier information for identifying the second lyrics part, so as to record the lyrics part which has been sung by the first user.

Optionally, the identifier information may include display time for the second lyrics part. For example, a starting time instant of the second lyrics part is 10 S, and an end time instant of the second lyrics part is 15 S. Alternatively, the identifier information may include a sentence identifier of the second lyrics part, for example, the second lyrics part is the first sentence, the third sentence and the fifth sentence. Specific forms of the identifier information are not limited herein, as long as the first client device can identify the second lyrics part based on the identifier.

The first client device may determine the second lyrics part in multiple ways. For example, the first client device may determine the lyrics part which has been sung by the first user based on effectiveness of a sound in the first recorded file.

Specifically, the first client device determines whether a sound recorded by the first user for a certain part of the lyrics is effective, and determines the certain part of the lyrics as the second lyrics part in a case that it is determined that the sound recorded by the first user is effective.

Optionally, the first client device determines whether a volume of the sound is greater than a first preset value, and determines that the sound recorded by the first user for the certain part of the lyrics is effective, in a case that it is determined that the volume of the sound is greater than the first preset value. A VAD algorithm or improved algorithms thereof may be referred to herein.

Preferably, after determining that the sound recorded by the first user for the certain part of the lyrics is effective, the first client device further determines whether time occupied by the recorded sound corresponds to the display time occupied by the lyrics part, and determines the lyrics part as the second lyrics part in a case that it is determined that the time occupied by the recorded sound corresponds to the display time occupied by the lyrics part.

For example, a sentence in the lyrics part is taken as a unit. After it is determined that a recorded sound for a certain sentence of the lyrics is effective, if display time occupied by the recorded sound for the certain sentence of the lyrics is 20 S-30 S and a display time occupied by the certain sentence of the lyrics is also 20 S-30 S, the certain sentence of the lyrics may be determined as the second lyrics part. Specifically, a threshold may be set. In a case that a proportion for an overlap of the display time occupied by the certain sentence of the lyrics with the display time occupied by the certain sentence of lyrics is greater than the threshold, it is determined that the display time occupied by the certain sentence of the lyrics corresponds to the display time occupied by the certain sentence of the lyrics.

It should be understood that, in the embodiment, the second lyrics part may be determined in other ways, which is not limited here. In an actual application, the first client device may determine the second lyrics part through a real-time audio detection module with the above determining method.

In step 404, the first client device mixes the first recorded file with the accompaniment audio file, to obtain a target audio file.

The mixing may be performed with the conventional mixing algorithm. For example, data for corresponding sample points is directly added to obtain a sum, and then the sum is divided by two.

Optionally, in order to prevent noise, or sound determined to be ineffective, in a lyrics part of the first recorded file other than the second lyrics part the method may further include the following step before step 404.

The first client device clears, based on the section information, the audio data corresponding to the lyrics parts in the first recorded file other than the second lyrics part. Hence, the obtained first recorded file includes audio data only during the display time for the second lyrics part, i.e., the obtained first recorded file only includes the effective sound sung by the first user.

In step 405, the first client device sends the target audio file and the section information to the server, such that a second client device obtains the target audio file and the section information from the server, and provides a Karaoke service to a second user based on the target audio file which is taken as an accompaniment audio and based on the section information.

The second client device obtains the target audio file and the section information from the server, and may provide the Karaoke service to the second user based on the target audio file which is taken as the accompaniment audio and based on the section information. Specifically, the second user may determine, based on the section information, lyrics parts which have been sung, and may sing lyrics parts which have not been sung.

Optionally, the method according to the embodiment may further include: generating, by the first client device, a configuration file, where the configuration file includes a sound effect parameter used by the first user; and sending, by the first client device, the configuration file to the server, such that the second client device provides the Karaoke service to the second user based on the target audio file which is taken as the accompaniment audio and based on the section information and the configuration file. Optionally, the sound effect parameter includes a reverberation parameter, a tone variation parameter and a sound landscaping parameter and so on.

Compared with the conventional technology, the target audio file according to the embodiment of the present disclosure is sung by the first user only during the display time for the second lyrics part, and is accompaniment audio at a lyrics part other than the second lyrics part. Therefore, a second client device may sing the lyrics parts other than the second lyrics part based on the section information when taking the target audio file as accompaniment audio, such that the first user sings the song during the display time for the second lyrics part and the second user sings the song during the display time for the lyrics parts other than the second lyrics part, thereby obtaining a Karaoke experience of singing together with others.

Figure 5:
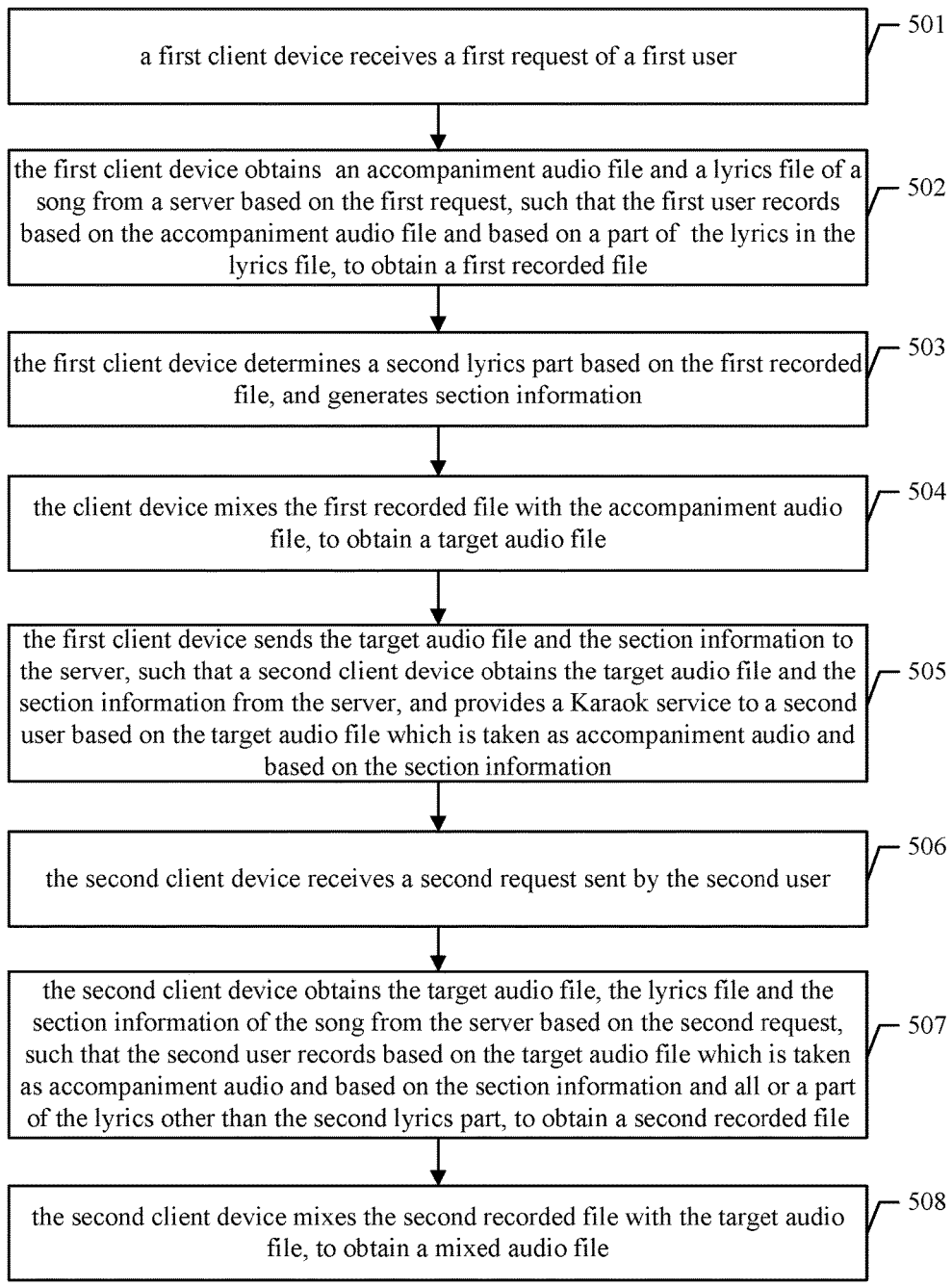
FIG. 5 is a diagram of an audio processing method according to another exemplary embodiment of the present disclosure.

Referring to FIG. 5, an audio processing method according to another embodiment of the present disclosure is shown. The method includes step 501 to step 508.

In step 501, a first client device receives a first request of a first user.

In step 502, the first client device obtains, based on the first request, an accompaniment audio file and a lyrics file of a song from a server, such that the first user records based on the accompaniment audio file and a part of the lyrics in the lyrics file, to obtain a first recorded file.

In step 503, the first client device determines a second lyrics part based on the first recorded file, and correspondingly generates section information.

In step 504, the first client device mixes the first recorded file with the accompaniment audio file, to obtain a target audio file.

In step 505, the first client device sends the target audio file and the section information to the server, such that a second client device obtains the target audio file and the section information from the server, and provides a Karaoke service to a second user by based on the target audio file which is taken as accompaniment audio and based on the section information.

A process of step 501 to step 505 is similar to the process of step 401 to step 405 according to the embodiment shown in FIG. 4, which is not described herein.

In step 506, the second client device receives a second request sent by a second user.

The second request is used to request to join a chorus, so as to trigger a chorus join process. For example, in an actual application, a button corresponding to a second chorus request may be provided in the second client device. When the second user presses the button, the second client device receives the second chorus request.

In step 507, the second client device obtains, based on the second request, a target audio file, a lyrics file and section information from the server, such that the second user records based on the target audio file which is taken as accompaniment audio and based on the section information and all or a part of the lyrics other than the second lyrics part, so as to obtain a second recorded file.

Once receiving the second request, the second client device firstly obtains the target audio file, the lyrics file and the section information from the server, and then plays the target audio file and the lyrics file. The second user sings based on all or a part of the lyrics other than the second lyrics part, and the second client device records the singing which is performed by the second user based on the target audio file which is taken as accompaniment audio and based on the section information and all or a part of the lyrics other than the second lyrics part, so as to obtain the second recorded file. It should be noted that, in a case that the second user sings based on a part of rather than all of the lyrics other than the second lyrics part, some lyrics parts of the song may be sung by more other users.

Optionally, in a case that the first client device sends a configuration file to the server and the configuration file is on the server, step 507 may be performed as follows. The second client device obtains the target audio file, the lyrics file, the section information and the configuration file of the song from the server, such that the second user records based on the target audio file which is taken as accompaniment audio and based on the section information, the configuration file and a part of or all of the lyrics other than the second lyrics part, so as to obtain the second recorded file. In an actual application, the client device configures based on a sound effect parameter in the configuration file and sends the configured parameter to the second user for selection. The user may change the parameter configuration as needed.

In step 508, the second client device mixes the second recorded file with the target audio file, to obtain a mixed audio file.

The mixing may be performed with conventional mixing algorithms. For example, data for corresponding sample points is directly added to obtain a sum, and the sum is divided by two.

It should be understood that, the mixing audio file is sung by the first user for the second lyrics part, and is sung by the second user for a part of or all of the lyrics other than the second lyrics part, thereby obtaining a Karaoke experience of singing together by two users.

Optionally, in the embodiment, in order to prevent noise, or a sound determined to be ineffective, in the lyrics part of the second recorded file other than the second lyrics part, the method may further include the following step before step 508. The second client device clears, based on the section information, audio data of the first recorded file corresponding to the second lyrics part.

Figure 6:
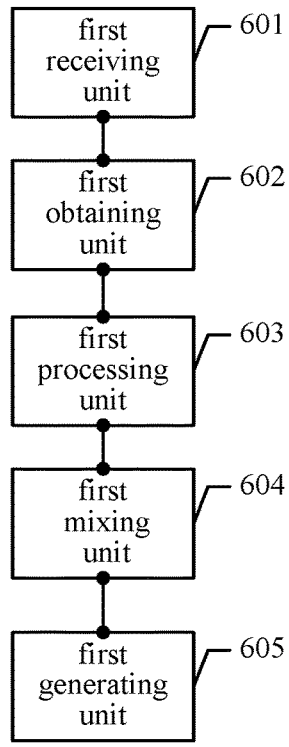
FIG. 6 is a diagram of an audio processing device according to an exemplary embodiment of the present disclosure.

The audio processing method according to the embodiments of the present disclosure is described above, and an audio processing device according to embodiments of the present disclosure is described hereinafter. Referring to FIG. 6, an audio processing device according to an embodiment of the present disclosure is shown. The audio processing device includes a first receiving unit 601, a first obtaining unit 602, a first processing unit 603 and a first mixing unit 604.

The first receiving unit 601 is configured to receive a request of a user.

The first obtaining unit 602 is configured to obtain an audio file and a corresponding lyrics file of a song based on the request. The lyrics file includes time information for identifying lyrics display time. The audio file of the song may include, for example, an accompaniment audio file and an original audio file of the song.

The first processing unit 603 is configured to play the audio file during display time for a first lyrics part and display time for a second lyrics part, and record audio data of the user during the display time for the first lyrics part of the lyrics file. The first processing unit 603 may be further configured to divide the lyrics file to obtain the first lyrics part and the second lyrics part.

In a case that the obtained audio file of the song includes the accompaniment audio file and the original audio file of the song, the first processing unit 603 plays the accompaniment audio file and records the audio data of the user during the display time for the first lyrics part, and plays the original audio file during the display time for the second lyrics part.

The first mixing unit 604 is configured to mix the audio data of the user with the audio data of the audio file corresponding to the display time for the first lyrics part, so as to obtain a mixed audio file. In a case that the audio file includes the accompaniment audio file and the original audio file, the first mixing unit 604 mixes the audio data of the user with audio data of the accompaniment audio file corresponding to the display time for the first lyrics part.

For ease of understanding, an internal operation process of the audio processing device according to the embodiment is described hereinafter with a specific application scenario as an example.

The first receiving unit 601 receives a Karaoke request input by a user. The first obtaining unit 602 obtains an accompaniment audio file, an original audio file and a lyrics file of a song based on the Karaoke request, where the lyrics file includes time information for identifying lyrics display time. The first processing unit 603 divides the lyrics file to obtain a first lyrics part and a second lyrics part, plays the accompaniment audio file and records audio data of the user during display time for the first lyrics part, and plays the original audio file during display time for the second lyrics part.

In the technical solutions according to the embodiments of the present disclosure, once receiving a Karaoke request input by a user via the first receiving unit 601, the first obtaining unit 602 of the client device obtains the accompaniment audio file, the original audio file and the corresponding lyrics file of the song based on the Karaoke request. The lyrics file includes time information for identifying lyrics display time. The first processing unit 603 divides the lyrics file to obtain the first lyrics part and the second lyrics part, plays the accompaniment audio file and records the audio data of the user during the display time for the first lyrics part, and plays the original audio file during the display time for the second lyrics part. Then the first processing unit 603 mixes the recorded audio data of the user with audio data of the accompaniment audio file corresponding to the display time for the first lyrics part to obtain the mixed audio file, outputs the mixed audio file during the display time for the first lyrics part, and outputs the original audio file during the display time for the second lyrics part, so as to generate a chorus file. Hence, compared with the conventional technology, according to the embodiments of the present disclosure, the client device divides the lyrics file to obtain the first lyrics part and the second lyrics part, plays the accompaniment audio file and records the audio data of the user only during the display time for the first lyrics part, and plays the original audio file during the display time for the second lyrics part, such that the user sings the song during the display time for the first lyrics part and the star sings the song during the display time for the second lyrics part, thereby obtaining a Karaoke experience of singing together with the star.

Optionally, the audio processing device may further include a first generating unit 605 according to the embodiment.

The first generating unit 605 is configured to output (or select) the mixed audio file during the display time for the first lyrics part, and output (or select) the audio file during the display time for the second lyrics part, to generate a chorus file. In a case that the audio file includes the accompaniment audio file and the original audio file, the original audio file is output (or selected) during the display time for the second lyrics part to generate the chorus file.

Optionally, the first receiving unit 601 is further configured to receive a dividing instruction of the user. The first processing unit 603 is configured to divide the lyrics file based on the dividing instruction, to obtain the first lyrics part and the second lyrics part.

Optionally, the first processing unit 603 is configured to detect whether a sound is input, and in a case that it is detected a sound is input, determine a lyrics part of the lyrics file displayed during the corresponding display time as the first lyrics part, plays the accompaniment audio file and records the audio data of the user, or in a case that it is detected no sound is input, determine a lyrics part of the lyrics file displayed during the corresponding display time as the second lyrics part, and plays the original audio file.

Optionally, the audio processing device may further include:

an identifier unit configured to set a first identifier for the first lyrics part displayed on the client device and set a second identifier for the second lyrics part displayed on the client device.

Optionally, the audio processing device may further include:

a first balancing unit configured to balance audio data of the chorus file at a switching point, where the switching point refers to a time instant when the display time for the first lyrics part is switched to the display time for the second lyrics part or a time instant when the display time for the second lyrics part is switched to the display time for the first lyrics part.

Figure 7:
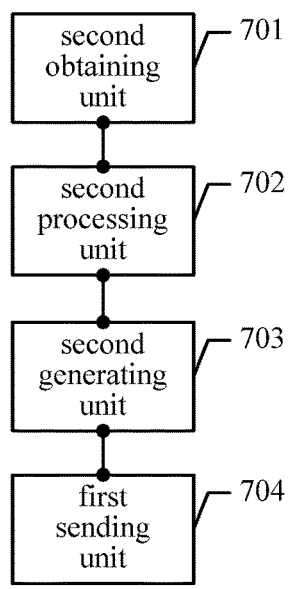
FIG. 7 is a diagram of an audio processing device according to another exemplary embodiment of the present disclosure.

Referring to FIG. 7, an audio processing device according to another embodiment of the present disclosure is shown. The audio processing device includes:

a second obtaining unit 701 configured to obtain an accompaniment audio file, an original audio file and a corresponding lyrics file of a song, where the lyrics file includes time information for identifying lyrics display time;

a second processing unit 702 configured to divide the lyric file to obtain a first lyrics part and a second lyrics part, and correspondingly generate lyrics dividing information, where the lyrics dividing information includes identifier information for identifying the first lyrics part;

a second generating unit 703 configured to output (or select) the accompaniment audio file during display time for the first lyrics part, and output (or select) the original audio file during display time for the second lyrics part, to generate a target audio file; and a first sending unit 704 configured to send the target audio file and the target lyrics file (for example, when receiving a Karaoke request sent by the client device) to the client device, such that the client device provides a Karaoke service to the user based on the target audio file which is taken as accompaniment audio and based on the target lyrics file which is taken as lyrics to be played. The target lyrics file is obtained through the lyrics file carrying the lyrics dividing information.

Compared with the conventional technology, according to the embodiment of the present disclosure, the target audio file sent from the audio processing device in the server to the client device is accompaniment audio during the display time for the first lyrics part and is original audio during the display time for the second lyrics part. Compared with the conventional technology in which the accompaniment audio file is directly provided to the client device, according to the embodiment of the present disclosure, the user can sing the song during the display time for the first lyrics part and the star sings the song during the display time for the second lyrics part, thereby obtaining a Karaoke experience of singing together with the star.

Optionally, the second processing unit 702 may determine section information of the lyrics file based on the time information, and divide the lyrics file based on the section information to obtain the first lyrics part and the second lyrics part.

Optionally, the second processing unit 702 may determine a verse part and a refrain part of the lyrics file, and then determine the verse part as the first lyrics part and determine the refrain part as the second lyrics part, or then determine the refrain part as the first lyrics part and determine the verse part as the second lyrics part.

Optionally, the second processing unit 702 may divide the lyrics file based on a custom template, to obtain the first lyrics part and the second lyrics part.

Optionally, the audio processing device may further include:

a second balancing unit configured to balance audio data of the target audio file at a switching point, where the switching point refers to a time instant when the display time for the first lyrics part is switched to the display time for the second lyrics part or a time instant when the display time for the second lyrics part is switched to the display time for the first lyrics part.

Figure 8:
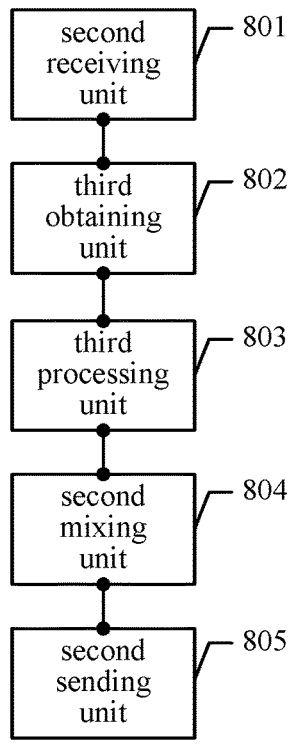
FIG. 8 is a diagram of an audio processing device according to an exemplary embodiment of the present disclosure.

Referring to FIG. 8, an audio processing device according to another embodiment of the present disclosure is shown. The audio processing device includes:

a second receiving unit 801 configured to receive a first request of a first user;

a third obtaining unit 802 configured to obtain, an accompaniment audio file and a lyrics file of a song from a server based on the first request, such that the first user records based on the accompaniment audio file and based on a part of the lyrics in the lyrics file, to obtain a first recorded file;

a third processing unit 803 configured to determine a second lyrics part based on the first recorded file and correspondingly generate section information, where the section information includes at least identifier information for identifying the second lyrics part;

a second mixing unit 804 configured to mix the first recorded file with the accompaniment audio file, to obtain a target audio file; and a second sending unit 805 configured to send the target audio file and the section information, such that a second client device obtains the target audio file and the section information from the server, and provides a Karaoke service to a second user based on the target accompaniment file which is taken as accompaniment audio and based on the section information.

Figure 9:
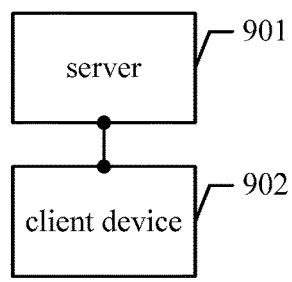
FIG. 9 is a diagram of an audio processing system according to an exemplary embodiment of the present disclosure.

Referring to FIG. 9, an audio processing system according to an embodiment of the present disclosure is shown. The audio processing system includes a server 901 and a client device 902. The audio processing method according to the above embodiments of the present disclosure may be performed by the server and/or client device of the audio processing system.

According to an optional embodiment of the present disclosure, the server 901 includes the audio processing device described according to the embodiment shown in FIG. 7.

According to an optional embodiment of the present disclosure, the client device 902 includes the audio processing device described according to the embodiment shown in FIG. 6.

Figure 10:
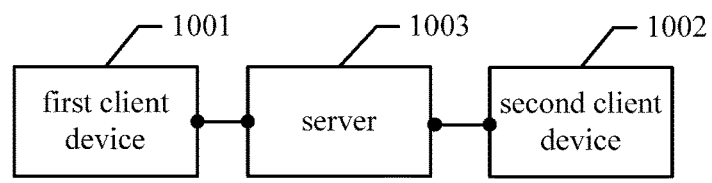
FIG. 10 is a diagram of an audio processing system according to another exemplary embodiment of the present disclosure.

Referring to FIG. 10, an audio processing system according to another embodiment of the present disclosure is shown. The audio processing system includes a first client device 1001, a second client device 1002 and a server 1003.

The first client device 1001 is configured to receive a first request of a first user, where the first request is for, for example, starting a chorus; obtain, based on the first request, an accompaniment audio file and a lyrics file of a song from the server 1003, such that the first user records based on the accompaniment audio file and based on a part of the lyrics in the lyrics file, to obtain a first recorded file; determine a second lyrics part based on the first recorded file and correspondingly generate section information, where the second lyrics part refers to a lyrics part which has been sung by the first user and the section information includes identifier information for identifying the second lyrics part; mix the first recorded file with the accompaniment audio file, to obtain the target audio file; and send the target audio file and the section information to the server 1003, such that a second client device obtains the target audio file and the section information from the server 1003 and provides a Karaoke service to a second user based on the accompaniment audio file which is taken as the accompaniment audio and based on the section information.

The second client device 1002 is configured to obtain the target audio file and the section information from the server 1003, and provide a Karaoke service to the second user based on the target audio file which is taken as the accompaniment audio file and based on the section information.

Optionally, the first client device 1001 may be specifically configured to determine whether a sound recorded by the first user for a certain part of the lyrics is effective, and determine the corresponding lyrics part as the second lyrics part, in a case that it is determined that the sound recorded by the first user is effective.

Optionally, the first client device 1001 may be specifically configured to determine whether a volume of the sound is greater than a preset value, and determine that the sound recorded by the first user for the certain lyrics part is effective, in a case that it is determined that the volume of the sound is greater than the preset value.

Optionally, the first client device 1001 may be specifically configured to determine whether a sound recorded by the first user for a certain lyrics part is effective, in a case that it is determined that the sound recorded by the first user is effective, further determine whether time occupied by the recorded sound corresponds to display time occupied by the certain lyrics part, and in a case that it is determined that the time occupied by the recorded sound corresponds to the display time occupied by the certain lyrics part, determine the certain lyrics part as the second lyrics part.

Optionally, the first client device 1001 may be further configured to clear, based on the section information, audio data of the first recorded file corresponding to a lyrics part other than the second lyrics part, before mixing the first recorded file with the accompaniment audio file to obtain the target audio file.

Optionally, the identifier information includes the display time for the second lyrics part or a sentence identifier of the second lyrics part.

Optionally, the first client device 1001 may be further configured to generate a configuration file before sending the target audio file and the section information to the server, where the configuration file includes a sound effect parameter used by the first user, and configured to send the configuration file to the server.

Optionally, the second client device 1002 may be further configured to receive a second request sent by a second user, where the second request is used to request to join a chorus, obtain, based on the second request, the target audio file, the lyrics file and the section information of the song from the server, such that the second user records based on the target audio file which is taken as accompaniment audio and based on the section information and all or a part of the lyrics other than the second lyrics part, to obtain a second recorded file, and mix the second recorded file with the target audio file, to obtain a mixed audio file.

Optionally, the second client device 1002 may be further configured to clear, based on the section information, audio data of the first recorded file corresponding to the second lyrics part, before mixing the second recorded file with the target audio file to obtain a mixed audio file.

Optionally, the second client device 1002 may be further configured to obtain the target audio file, the lyrics file, the section information and the configuration file of the song from the server in a case that the server includes the configuration file, such that the second user records based on the target audio file which is taken as the accompaniment audio and based on the section information, the configuration file and a part of or all of the lyrics other than the second lyrics part, to obtain a second recorded file.

Optionally, the second client device may be specifically configured to receive a third request sent by a second user, where the third request is used to request to join a chorus and to instruct to record only for a part of the lyrics other than the second lyrics part; obtain, the target audio file, the lyrics file and the section information of the song from the server based on the third request, such that the second user records based on the target audio file which is taken as the accompaniment audio and based on the section information and the part of lyrics other than the second lyrics part, to obtain a third recorded file; determine a third lyrics part and add identifier information for identifying the third lyrics part into the section information, where the third lyrics part refers to the lyrics part which has been sung by the second user; mix the third recorded file with the target audio file to obtain a third target file; and send the third target file and the section information to the server, such that the third client device records for a third user via the server based on the third target file which is taken as the accompaniment audio, based on the section information, and based on a part of the lyrics other than both of the second lyrics part and the third lyrics part.

In an optional embodiment of the present disclosure, the second client device 1002 in FIG. 10 is configured to perform the audio processing method according to the exemplary embodiment of the present disclosure described in FIG. 1, the server 1003 is configured to perform the audio processing method according to the exemplary embodiment of the present disclosure described in FIG. 2, and the first client device 1001 is configured to perform the audio processing method according to the exemplary embodiment of the present disclosure described in FIG. 4.

In addition, an audio processing device is provided according to an exemplary embodiment of the present disclosure. The audio processing device includes at least one processor and a memory. The memory stores program instructions which when executed by the processor configure the audio processing device to perform the method according to any embodiment above.

In addition, a computer readable storage medium is provided according to an exemplary embodiment of the present disclosure. The computer readable storage medium stores program instructions which when executed by the processor configure the computing device to perform the method according to any embodiment above.

Those skilled in the art should understand that, for convenience and conciseness of the description, one may refer to corresponding processes in the method embodiments above, for operation processes of the systems, devices and units above, which are not described herein.

In the several embodiments provided in the present disclosure, it should be understood that the disclosed systems, devices and methods may be implemented in other ways. For example, the device embodiments are only exemplary. For example, the units are grouped only based on a logic function, and actually the units may be grouped in other ways. For example, multiple units or assemblies may be combined or integrated to another system, or some features may be ignored or not implemented. In addition, the displayed or discussed coupling between each other, direct coupling or communication connection may be indirect coupling or communication connection via some interfaces, devices or units, and may be electric, mechanic or in other forms.

The units illustrated as separated components may be physically separated or not. The components displayed as units may be physical units or not, i.e., the components may be located at the same position or distributed to multiple network units. A part or all of the units may be selected as needed to achieve the objects of the solutions of the embodiments.

In addition, various functional units in the embodiments of the present disclosure may be integrated in one processing unit, may be units physically independently, or two or more units may be integrated in one unit. The integrated unit may be implemented by hardware or a software function unit.

In a case that the integrated unit is implemented as the software function unit and sold or used as an independent product, the integrated unit may be stored in a computer readable storage medium. Based on such understanding, the essence part or the part contributing to the conventional technology of the technical solutions of the present disclosure, or all of or a part of the technical solutions may be embodied by a software product. The software product is stored in a storage medium and includes several instructions to allow a computer device (which may be a personal computer, a server or a network device and so on) to perform all or a part of the steps of the methods according to various embodiments of the present disclosure. The storage medium includes various mediums which can storage program codes, for example, a USB flash disk, a movable hard disk, a read-only memory (ROM, Read-Only Memory), a random access memory (RAM, Random Access Memory), a magnetic disk or an optical disk.

The above embodiments are only used to illustrate the technical solutions of the present disclosure and are not intended to limit the present disclosure. Although the present disclosure is described in detail in conjunction with the previous embodiments, those skilled in the art should understand that they may change the technical solutions recorded in the previous embodiments, or perform equivalent replacement on a part of the technical features. These changes or replacements do not make the essence of corresponding technical solutions depart from the spirit and scope of the technical solutions of the embodiments of the present disclosure.

The invention claimed is:

1. An audio processing method, comprising:
obtaining an audio file of a song and a lyrics file of the song, wherein the audio file comprises an accompaniment audio part and an original audio part;
dividing the lyrics file to obtain a first lyrics part and a second lyrics part;

playing the accompaniment audio part and recording audio data of a user by collecting the audio data through a microphone, during display time for the first lyrics part of the lyrics file;

turning off the microphone and playing the original audio part, during display time for the second lyrics part of the lyrics file; and mixing the audio data collected through the microphone with audio data of the accompaniment audio part corresponding to the display time for the first lyrics part.

2. The method according to claim 1, wherein no audio data of the user is recorded during the display time for the second lyrics part of the lyrics file.

3. The method according to claim 1, wherein before the obtaining the audio file of the song and the lyrics file of the song, the method further comprises receiving a request of the user; and the obtaining the audio file of the song and the lyrics file of the song comprises: obtaining, based on the request, an accompaniment audio file, an original audio file and the lyrics file of the song, wherein the accompaniment audio file comprises the accompaniment audio part and the original audio file comprises the original audio part.

4. The method according to claim 3, wherein the mixing the audio data collected through the microphone with the audio data of the accompaniment audio part corresponding to the display time for the first lyrics part comprises: mixing the audio data collected through the microphone with audio data of the accompaniment audio file corresponding to the display time for the first lyrics part.

5. The method according to claim 3, wherein a mixed audio file is generated by the mixing, and the method further comprises:

generating a chorus file based on the mixed audio file corresponding to the display time for the first lyrics part and based on the original audio file corresponding to the display time for the second lyrics part.

6. The method according to claim 1, further comprising: receiving a dividing instruction of the user, wherein dividing the lyrics file to obtain the first lyrics part and the second lyrics part comprises:

dividing, based on the diving instruction, the lyrics file to obtain the first lyrics part and the second lyrics part.

7. The method according to claim 1, further comprising: detecting whether a sound is input, and determining a lyrics part of the lyrics file corresponding to the display time as the first lyrics part in a case that it is detected that the sound is input; or determining a lyrics part of the lyrics file corresponding to the display time as the second lyrics part in a case that it is detected that no sound is input.

8. The method according to claim 1, wherein a mixed audio file is generated by the mixing, and the method further comprises:

generating a chorus file based on the mixed audio file corresponding to the display time for the first lyrics part and based on the audio file of the song corresponding to the display time for the second lyrics part.

9. The method according to claim 8, further comprising: balancing audio data of the chorus file at a switching point, wherein the switching point indicates a time instant when the display time for the first lyrics part is switched to the display time for the second lyrics part or a time instant when the display time for the second lyrics part is switched to the display time for the first lyrics part.

10. The method according to claim 1, wherein before the obtaining the audio file of the song and the lyrics file of the song, the method further comprises:

obtaining an accompaniment audio file, an original audio file and the lyrics file of the song;

generating lyrics dividing information, wherein the lyrics dividing information comprises at least identifier information for identifying the first lyrics part; and generating the audio file of the song based on the accompaniment audio file corresponding to the display time for the first lyrics part and the original audio file corresponding to the display time for the second lyrics part.

11. The method according to claim 10, wherein the obtaining the audio file of the song and the lyrics file of the song further comprises: obtaining the lyrics dividing information; and the recording the audio data of the user during the display time for the first lyrics part of the lyrics file comprises: recording, based on the lyrics dividing information, the audio data of the user during the display time for the first lyrics part.

12. The method according to claim 1, wherein the lyrics file comprises time information for identifying lyrics display time, and the method further comprises:

determining, based on the time information, section information of the lyrics file, wherein dividing the lyrics file to obtain the first lyrics part and the second lyrics part comprises:

dividing, based on the section information, the lyrics file to obtain the first lyrics part and the second lyrics part.

13. The method according to claim 1, further comprising: determining a verse part and a refrain part of the lyrics file; and determining the verse part as the first lyrics part and determining the refrain part as the second lyrics part, or determining the refrain part as the first lyrics part and determining the verse part as the second lyrics part.

14. The method according to claim 1, wherein dividing the lyrics file to obtain the first lyrics part and the second lyrics part comprises:

dividing, based on a custom template, the lyrics file to obtain the first lyrics part and the second lyrics part.

15. The method according to claim 1, wherein before the obtaining the audio file of the song and the lyrics file of the song, the method further comprises:

receiving a request of another user;

obtaining, based on the request, an accompaniment audio file and the lyrics file of the song;

recording for the another user based on the accompaniment audio file and a part of lyrics of the lyrics file, to obtain a first recorded file;

determining the second lyrics part based on the first recorded file, and correspondingly generating section information, wherein the section information comprises at least identifier information for identifying the second lyrics part; and mixing the first recorded file with the accompaniment audio file to obtain the audio file of the song.

16. The method according to claim 15, wherein the determining the second lyrics part based on the first recorded file comprises:

determining whether a sound recorded by the another user for a certain part of lyrics is effective, and determining the certain part of lyrics as the second lyrics part in a case that it is determined that the sound recorded is effective.

17. The method according to claim 15, further comprising generating a configuration file, wherein the configuration file comprises a sound effect parameter used by the another user.

18. The method according to claim 17, wherein the recording the audio data of the user during the display time for the first lyrics part of the lyrics file comprises:
recording based on the audio file of the song which is used as an accompaniment audio and based on the section information, the configuration file and a lyrics part of the lyrics file other than the second lyrics part.

19. An audio processing device, comprising at least one processor and a memory, wherein the memory stores program instructions which when executed by the processor configure the audio processing device to perform the method according to claim 1.

20. An audio processing system, comprising a server and at least one client device, wherein the server and/or the client device is configured to perform the method according to claim 1.

21. The system according to claim 20, wherein the at least one client device comprises a first client device, and the first client device is configured to perform the method according to claim 1.

22. The system according to claim 21, wherein the server is configured to:
obtain an accompaniment audio file, an original audio file and the lyrics file of the song;
generate lyrics dividing information, wherein the lyrics dividing information comprises at least identifier information for identifying the first lyrics part; and
generate the audio file of the song based on the accompaniment audio file corresponding to display time for the first lyrics part and based on the original audio file corresponding to display time for the second lyrics part.

23. The system according to claim 22, wherein the at least one client device further comprises a second client device, and the second client device is configured to:
receive a request of another user;
obtain, based on the request, the accompaniment audio file and the lyrics file of the song;
record for the another user based on the accompaniment audio file and a part of lyrics of the lyrics file, to obtain a first recorded file;
determine the second lyrics part based on the first recorded file, and correspondingly generate section information, wherein the section information comprises identifier information for identifying the second lyrics part; and
mix the first recorded file with the accompaniment audio file to obtain the audio file of the song.

24. An audio processing device, comprising:
a first obtaining unit, configured to obtain an audio file of a song and a lyrics file of the song, wherein the audio file comprises an accompaniment audio part and an original audio part;
a first processing unit, configured to play the accompaniment audio part during display time for a first lyrics part of the lyrics file and play the original audio part during display time for a second lyrics part of the lyrics file, record audio data of a user by collecting the audio data through a microphone during the display time for the first lyrics part of the lyrics file, and turn off the microphone during the display time for the second lyrics part of the lyrics file;
a second processing unit, configured to divide the lyrics file to obtain the first lyrics part and the second lyrics part; and
a first mixing unit, configured to mix the audio data collected through the microphone with audio data of the accompaniment audio part corresponding to the display time for the first lyrics part.

25. The device according to claim 24, further comprising a first receiving unit configured to receive a request of the user,
wherein the first obtaining unit is further configured to obtain, based on the request, an accompaniment audio file, an original audio file and the lyrics file of the song,
wherein the accompaniment audio file comprises the accompaniment audio part and the original audio file comprises the original audio part.

26. The device according to claim 25, wherein the first mixing unit is further configured to mix the audio data collected through the microphone with audio data of the accompaniment audio file corresponding to the display time for the first lyrics part.

27. The device according to claim 25, wherein a mixed audio file is generated by the mixing, and the device further comprises:
a first generating unit, configured to generate a chorus file based on the mixed audio file corresponding to the display time for the first lyrics part and based on the original audio file corresponding to the display time for the second lyrics part.

28. The device according to claim 24, further comprising:
a second obtaining unit, configured to obtain an accompaniment audio file, an original audio file and the lyrics file of the song,
wherein the second processing unit, unit is further configured to generate lyrics dividing information, wherein the lyrics dividing information comprises at least identifier information for identifying the first lyrics part; and
a second generating unit, configured to generate the audio file of the song based on the accompaniment audio file corresponding to the display time for the first lyrics part and the original audio file corresponding to the display time for the second lyrics part.

29. The device according to claim 24, further comprising:
a second receiving unit, configured to receive a request of another user;
a third obtaining unit, configured to obtain, based on the request, an accompaniment audio file and the lyrics file of the song, and record for the another user based on the accompaniment audio file and a part of lyrics of the lyrics file, to obtain a first recorded file;
a third processing unit, configured to determine the second lyrics part based on the first recorded file, and generate section information, wherein the section information comprises at least identifier information for identifying the second lyrics part; and
a second mixing unit, configured to mix the first recorded file with the accompaniment audio file, to obtain the audio file of the song.

* * * * *